Patented Nov. 28, 1950

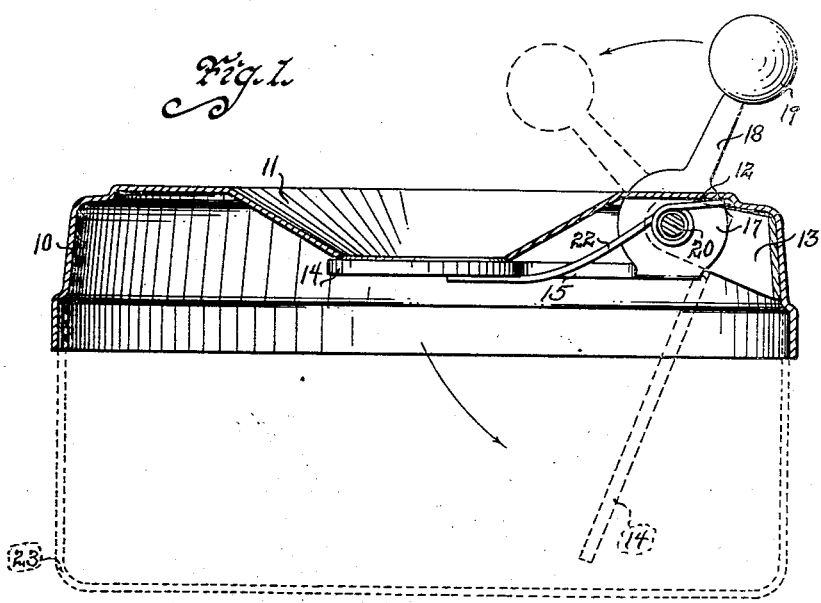
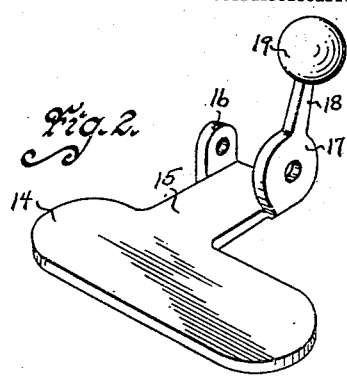
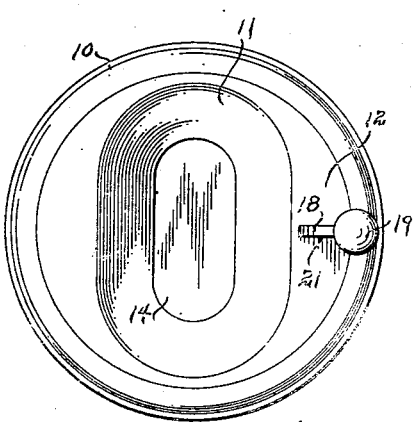
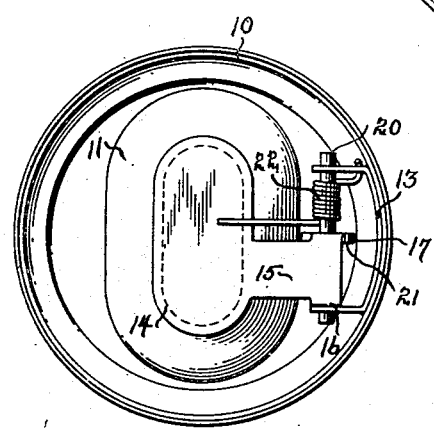

2,531,503

UNITED STATES PATENT OFFICE 2,531,503

TRAP DOOR HOPPER TOP

Marion Talbert Dick, Des Moines, Iowa, assignor to Cadet Smokestands Company, Des Moines, Iowa, a business trust Application January 3, 1947, Serial No. 720,113

5 Claims. (Cl. 220—20.5)

1

This invention relates to a manually operated trap door hopper top and while the device may be used successfully in connection with items in the tobacco ash receptacle field such as smokestands and desk model tobacco ash containers, it may well be used for other purposes wherein a simple manually operated trap door is desired. The invention, therefore, is a trap door for a hopper or like and is not a smokestand per se.

The principal objects, therefore, of my invention are to provide a trap door construction that is simple in construction, easily cleaned, durable in use, refined in appearance, and economical in manufacture.

A further object of this invention is to provide a trap door hopper top that has its operating handle above the hopper top, but at one side and clear of the hopper portion of the hopper top.

A still further object of this invention is to provide a trap door hopper top that substantially seals the hopper against leakage when the trap door is in a closed position.

A still further object of my invention is to provide a tap door hopper top that permits a relatively strong closing spring without interfering with its ease of manual operation.

A still further object is to provide a direct drive trap door hopper top that will operate successfully on almost any type of container.

These and other objects will be apparent to those skilled in the art.

My invention consists in the construction, arrangement and combination of the various parts of the device, whereby the objects contemplated are attained as hereinafter more fully set forth, pointed out in my claims and illustrated in the accompanying drawings, in which:

Fig. 1 is a side-sectional view of my device ready for use.

Fig. 2 is a perspective view of the trap door and operating handle.

Fig. 3 is a reduced top plan view of the trap door hopper top.

Fig. 4 is a reduced bottom view of the device and more fully illustrates its construction.

There are many types of trap door hopper tops on the market. Some have the objectionable feature of the operating means being indirectly connected to the trap door. Others have operating handles of fragile construction, or so located as to be subject to damage in case of fall or during shipment. I have overcome such objections by providing a positive direct drive trap door of sturdy construction, few parts, and with the operating handle conveniently located above the

2 hopper top and adjacent the hopper wall portion.

Referring to the drawings, I have used the numeral 10 to generally designate the hopper top having a continuous circular hopper wall 11, extending downwardly and inwardly and terminating in a receiving opening. The numeral 12 designates a horizontal flat surface adjacent the hopper 11. It is to such or similar hopper top that I secure my direct drive trap door. The numeral 13 designates a U-shaped bearing member secured to the hopper top by any suitable means such as by soldering, spot welding, riveting, or like. This bearing member may be of a plurality of parts, or of any suitable design, or may be of one piece, as shown in Fig. 4. The numeral 14 designates the trap door having a tongue portion 15 extending laterally and off center, as shown in Fig. 2. At the two sides of the free end of this tongue are the two bearing ears 16 and 17. The bearing ear 17 is larger than the bearing ear 16 and has its upper portion of circular construction. The numeral 18 designates a handle lever integrally formed on the upper portion of the bearing ear 17, and extends upwardly and outwardly when the trap door is in a closed position, as shown in Fig. 1. The numeral 19 designates a grippable ball or like on the upper free end of the handle lever. The numeral 20 designates a shaft extending through the bearing member and the bearing ears 16 and 17. The numeral 21 designates a slit opening in the top 12 extending in a plane that bisects the receiving opening of the hopper and through which the upper portion of the circular bearing ear 17 protrudes. The shaft is so positioned, and the dimensions of the circular bearing ear and slit opening are such that the slit opening will be substantially closed at all times by the bearing ear 17, regardless of the position of rotation of the bearing ear in the slit opening. By this construction the slit opening through which the bearing ear extends and moves, will be closed even when the trap door is moved to the open position shown by dotted lines in Fig. 1. The length of the tongue portion is such that the trap door will close the hopper opening when the trap door is in a closed position. The trap door is yieldingly held in a closed position by a spring 22 embracing the shaft, having one end engaging the bearing member or hopper top and its other end engaging the bottom of the trap door, as shown in Fig. 4. By the tongue portion being off center relative to the trap door proper, room is provided for the spring on the shaft and the end of the spring may centrally engage the bottom of the trap door, thereby eliminating any side pressure or canting in use. Also, the bearing ear 17 is substantially in a central plane of the trap door proper, thereby eliminating any twisting action when the operating means is actuated, and centrally locating the handle lever above the hopper top. To operate the trap door it is merely necessary to manually move the handle lever toward the hopper opening and against the action of the spring. Upon release of the lever, the spring will return the trap door to a closed position onto the hopper opening.

The trap door proper, tongue portion, bearing ears, and handle lever are stamped from a single sheet of material. To dissemble the device, it is merely necessary to remove the shaft and the ball or like 19. If desired, the ball 19 may be dispensed with entirely in which event the entire trap door consists of only four pieces.

The numeral 23 designates a container, shown in dotted lines, but not claimed.

Some changes may be made in the construction and arrangement of my improved trap door hopper top without departing from the real spirit and purpose of my invention, and it is my intention to cover by my claims any modified forms of structure or use of mechanical equivalents which may be reasonably included within their scope.

I claim:

1. In combination with a hopper top having a downwardly extending wall terminating in a receiving opening, and a flat horizontal portion adjacent the downwardly extending wall having a slit opening with its length extending in a plane that bisects said receiving opening, a trap door comprising, a main flat portion capable of closing said receiving opening when in a closed position, a horizontal tongue portion on said main portion, a bearing ear on said tongue portion, a second bearing ear on said tongue portion having its upper portion circular and extending through said slit opening, a means for pivoting said two bearing ears to said hopper top, a means for yieldingly holding said trap door in a closed position, and a handle means on that portion of said second ear that extends through said slit opening.

2. In combination with a hopper top having a downwardly extending wall terminating in a receiving opening, and a flat horizontal portion adjacent the downwardly extending wall having a slit opening with its length extending in a plane that bisects said receiving opening, a trap door comprising, a main flat portion capable of closing said receiving opening when in a closed position, an off center tongue portion extending from said trap door, a bearing ear on said tongue portion, a second bearing ear on said tongue portion having its upper portion circular and extending through said slit opening, a shaft extending through said two bearing ears and operatively secured to said hopper top, a spring on said shaft having one end engaging the central portion of said trap door and its other end operatively engaging said hopper top, and a handle means on that portion of said second bearing ear that extends through said slit opening.

3. In combination with a hopper top having a downwardly extending wall terminating in a receiving opening, and a flat horizontal portion adjacent the downwardly extending wall having a slit opening with its length extending in a plane that bisects said receiving opening, a trap door comprising, a main flat portion capable of closing said receiving opening when in a closed position, an off center tongue portion extending from said trap door, a bearing ear on said tongue portion, a second bearing ear on said tongue portion having its upper portion circular and extending through said slit opening, a shaft extending through said two bearing ears and operatively secured to said hopper top, a spring on said shaft having one end engaging the central portion of said trap door and its other end operatively engaging said hopper top, and a handle means on that portion of said second bearing ear that extends through said slit opening extending upwardly and outwardly.

4. In combination with a hopper top having a downwardly extending wall terminating in a receiving opening, and a flat horizontal portion adjacent the downwardly extending wall having a slit opening with its length extending in a plane that bisects said receiving opening, a trap door comprising, a main flat portion capable of closing said receiving opening when in a closed position, an off center tongue portion extending from said trap door, a bearing ear on said tongue portion, a second bearing ear on said tongue portion having its upper portion circular and extending through said slit opening, a shaft extending through said two bearing ears and operatively secured to said hopper top, a spring on said shaft having one end engaging the central portion of said trap door and its other end operatively engaging said hopper top, and a handle means on that portion of said second bearing ear that extends through said slit opening; said spring being located on said shaft at one side of said first and second mentioned ears and having a portion of its length extending parallel to, and at one side of said tongue portion.

5. In combination with a hopper top comprising a rim portion, a flat top portion, a downwardly and inwardly extending hopper wall in the center portion of said flat top portion terminating in an opening, and a slit opening in said flat portion extending in a plane that crosses said opening, a trap door means comprising; a flat trap door, a tongue extending from said trap door, a vertical bearing ear extending from one side of said tongue and extending through said slit opening, a second vertical ear extending from the other side of said tongue, a shaft extending through both of said ears and secured to the under side of said hopper top and positioned back of its downwardly and inwardly extending hopper wall, a handle member on said first mentioned ear, and a spring means for yieldingly holding said flat trap door in an elevated position for closing the opening of said downwardly and inwardly extending hopper wall.

MARION TALBERT DICK.

REFERENCES CITED

The following references are of record in the file of this patent:

UNITED STATES PATENTS

| Number | Name | Date |
|---|---|---|
| 110,872 | Sansom | Jan. 10, 1871 |
| 1,928,041 | Windesheim | Sept. 26, 1933 |
| 2,006,692 | Go et al. | July 2, 1935 |
| 2,014,582 | Putz | Sept. 17, 1935 |
| 2,248,163 | Dick et al. | July 8, 1941 |